United States Patent Office.

DAVID H. PRIEST, OF WATERTOWN, MASSACHUSETTS.

Letters Patent No. 77,404, dated April 28, 1868.

IMPROVED READY SOLDER.

*The Schedule referred to in these Letters Patent and making part of the same.*

TO ALL WHOM IT MAY CONCERN:

Be it known that I, DAVID H. PRIEST, of Watertown, county of Middlesex, and State of Massachusetts, have invented a new and useful Soldering-Composition; and I hereby declare the following to be a full and exact description of the same, and of the mode of putting it up and applying it to use.

The nature of my invention consists in providing a composition of ingredients, to be named hereafter, such, that by applying it to the parts to be united or soldered, and melting the solder upon it with a flame, or otherwise, the soldering can be conveniently and effectually accomplished without the use of any soldering-iron; also in putting up said composition in bottles having solder-wire wound around them, so that the whole may be most convenient for use and transportation.

To form my composition, I take about one pint of muriatic acid, and add to it a half a pound of zinc, one-sixth of a pint of rosin, and one sixth of a pint of sal-ammoniac. To this mixture I add about one-third of its bulk of water, and put the composition in a bottle of convenient size, and close it up.

For convenience in use, I take the ordinary solder used for tin-work, in the form of wire, and coil it around the neck or other part of the bottle containing the composition above described, so that by uncoiling at one end, it may be always convenient for application together with the composition.

To use my composition, I wet the parts to be joined or soldered with the composition, and, melting the solder in a lamp or gas flame, apply it immediately, and the melted solder will at once adhere to the parts moistened with the composition, as wax to paper.

In this way soldering can be most conveniently and expeditiously accomplished without the use of an iron.

I claim the above-described composition for soldering metals, prepared and compounded substantially as described, and in about the proportions specified.

I claim putting up the above-claimed composition in bottles having solder-wire wound around them, convenient for use and transportation, substantially as described.

DAVID H. PRIEST.

Witnesses:
J. L. NEWTON,
ALBERT A. YOUNG.